US012728382B2

(12) United States Patent
Grahl et al.

(10) Patent No.: US 12,728,382 B2
(45) Date of Patent: Sep. 8, 2026

(54) PROCESS AND APPARATUS FOR REMOVING UNWANTED COMPONENTS FROM A GAS MIXTURE

(71) Applicant: Linde GmbH, Pullach (DE)

(72) Inventors: Matthias Grahl, Munich (DE); Christan Horn, Munich (DE); Gabriel Salazar Duarte, Munich (DE); Verena Kramer, Munich (DE)

(73) Assignee: Linde GmbH, Pullach (DE)

( * ) Notice: Subject to any disclaimer, the term of this patent is extended or adjusted under 35 U.S.C. 154(b) by 654 days.

(21) Appl. No.: 17/996,471

(22) PCT Filed: Apr. 8, 2021

(86) PCT No.: PCT/EP2021/025129
§ 371 (c)(1),
(2) Date: Oct. 18, 2022

(87) PCT Pub. No.: WO2021/213699
PCT Pub. Date: Oct. 28, 2021

(65) Prior Publication Data

US 2023/0201758 A1 Jun. 29, 2023

(30) Foreign Application Priority Data

Apr. 23, 2020 (EP) .................................... 20020191

(51) Int. Cl.
*B01D 53/04* (2006.01)
*C10G 5/02* (2006.01)
*C10L 3/10* (2006.01)

(52) U.S. Cl.
CPC .......... *B01D 53/0462* (2013.01); *C10G 5/02* (2013.01); *B01D 2253/102* (2013.01);
(Continued)

(58) Field of Classification Search
CPC ............... B01D 53/04; B01D 53/0462; B01D 2253/102; B01D 2253/104;
(Continued)

(56) References Cited

U.S. PATENT DOCUMENTS 3,712,027 A * 1/1973 Hasz ........................ C07C 7/12
95/143
3,950,154 A * 4/1976 Henderson .......... B01D 53/261
96/126

(Continued)

FOREIGN PATENT DOCUMENTS

EP 1226860 A1 7/2002
EP 2789376 A1 10/2014

(Continued)

*Primary Examiner* — Frank M Lawrence, Jr.
(74) *Attorney, Agent, or Firm* — Millen, White, Zelano & Branigan, P.C.; Brion P. Heaney

(57) ABSTRACT

A process for removal of unwanted components from a feed gas mixture, wherein a temperature swing adsorption unit comprising at least two adsorption vessels is used, the method comprising cyclically operating the temperature swing adsorption unit in successive operation modes in each of which a different one of the at least two adsorption vessels is operated in an adsorption mode while a further one of the at least two adsorption vessels previously operated in the adsorption mode is operated in a regeneration mode, the adsorption mode comprising forming an adsorption gas stream using a part of the feed gas mixture and passing the adsorption gas stream through the adsorption vessel operated in the adsorption mode, and the regeneration mode comprising passing a regeneration gas stream through the adsorption vessel operated in the regeneration mode, thereby forming the purified gas mixture.

19 Claims, 5 Drawing Sheets

(52) U.S. Cl.
CPC .. *B01D 2253/104* (2013.01); *B01D 2253/106* (2013.01); *B01D 2257/7022* (2013.01); *B01D 2257/80* (2013.01); *B01D 2258/018* (2013.01); *B01D 2259/402* (2013.01); *B01D 2259/403* (2013.01); *C10L 3/101* (2013.01); *C10L 2290/542* (2013.01)

(58) Field of Classification Search
CPC ........ B01D 2253/106; B01D 2253/108; B01D 2257/7022; B01D 2257/80; B01D 2258/018; B01D 2259/402; B01D 2259/403; C10G 5/02; C10L 3/101; C10L 2290/542; Y02C 20/40
USPC .... 96/108, 121, 126, 146; 95/114, 115, 117, 95/121–126, 143
See application file for complete search history.

(56) References Cited

U.S. PATENT DOCUMENTS 4,479,814 A * 10/1984 Oliker .................... B01D 53/04 96/115
5,908,492 A * 6/1999 Lehman ............. B01D 53/0407 96/144
7,442,233 B2 10/2008 Mitariten
10,105,637 B2 10/2018 Hashi
2002/0134234 A1* 9/2002 Kalbassi .............. B01D 53/261 96/111
2013/0192299 A1 8/2013 Dolan et al.
2015/0308734 A1 10/2015 Bauer
2017/0087505 A1* 3/2017 Hashi ................. B01D 53/0423

FOREIGN PATENT DOCUMENTS

EP 3199222 A1 8/2017
WO 2013/116627 A1 8/2013

* cited by examiner

PROCESS AND APPARATUS FOR REMOVING UNWANTED COMPONENTS FROM A GAS MIXTURE

The present invention relates to a process for removing unwanted components from a gas mixture, particularly for removing heavy hydrocarbons from a hydrocarbon-rich gas mixture, particularly from natural gas, and to corresponding apparatus according to the preambles of the independent claims.

BACKGROUND OF THE INVENTION

As generally known and as e.g. described in US 2015/308734 A1 of the present applicant, liquefaction and subcooling of hydrocarbon-rich gas mixtures like natural gas is typically performed using at least one pure refrigerant cycle and/or at least one mixed refrigerant cycle. In the context of gas liquefaction, clogging of process equipment, which can be caused by solidification ("freezing") of certain components, particularly of so-called heavy hydrocarbons, must be avoided.

In the field of natural gas liquefaction, heavy hydrocarbons are generally defined as hydrocarbons comprising six or more carbon atoms such as hexanes and higher, and these may also include, according to the definition used herein, hydrocarbons with five carbon atoms. Heavy hydrocarbons typically also include aromatic compounds, particularly benzene, toluene and xylene (BTX). The present invention particularly relates to the treatment of gas mixtures containing such heavy hydrocarbons besides lighter hydrocarbons, particularly methane. Such gas mixtures may also contain hydrocarbons with two to four carbon atoms, particularly ethane, propane, butane, isobutane, and pentane. The latter are also referred to as natural gas liquids. Hydrocarbons with five carbon atoms may, according to the present invention, be part of (unwanted) heavy hydrocarbons to be removed from a corresponding gas mixture, but they may also be considered to represent hydrocarbons to be transferred into a purified gas mixture.

Particularly, the present invention relates to treatment of natural gas but is not limited thereto. The present invention may be used in the context of other gas mixtures with the same or similar properties as just described in connection with hydrocarbon-rich gas. However, the present invention may also be used in treating other gas mixtures in which unwanted components are present, particularly mixtures such as air wherein unwanted components may include water and hydrocarbons or mixtures such as synthesis gas from steam reforming where unwanted components may likewise include water, etc. Typically, the unwanted components are condensable without using cryogenic temperatures. Corresponding gas mixtures may also include carbon dioxide as an unwanted component which may be removed using other means such as physical or chemical scrubbing technologies and the like at an appropriate position of the process.

Generally, the present invention is usable in all applications where a gas mixture comprises components that may be removed by adsorption processes. Only for illustration purposes, the further description will focus on hydrocarbon-rich gas mixtures. For example, the purification of air to be processed in a cryogenic air separation unit, including a removal of water and carbon dioxide by adsorption using zeolithes, is described in H.-W. Häring (Ed.), Industrial Gases Processing, Wiley-VCH, 2006, particularly Section 2.2.5, "Cryogenic Rectification".

While unwanted components such as water may typically be removed from hydrocarbon-rich gas mixtures to be liquefied, if present, at ambient temperatures to a sufficient extent, heavy hydrocarbons are classically removed by subjecting the gas mixture to be liquefied to an initial partial condensation, causing heavy hydrocarbons to liquefy. These heavy hydrocarbons are then removed as a heavy hydrocarbon fraction.

Such a partial condensation as described can be realized with different process steps such as refrigeration, expansion, absorption or, particularly in natural gas treatment, cryogenic absorption. If the hydrocarbon-rich gas mixture to be liquefied comprises a sufficiently high content of components with an intermediate boiling range, for example propane, butane and/or pentane, which during cooling of the gas mixture also undergo a sufficient liquefaction and thus effectively act as a solvent for the heavy hydrocarbons to be removed. Particularly in so-called lean natural gas, such components are only present in small amounts, and a sufficient depletion by partial condensation via cryogenic absorption is generally not possible.

For several reasons, processes including an adsorptive removal of heavy hydrocarbons from hydrocarbon-rich gas mixtures have been proposed as an alternative to partial condensation, particularly for treating lean natural gases.

For example, WO 2013/116627 A1 discloses a process for removing heavy hydrocarbons from a natural gas stream which comprises passing the natural gas stream through a temperature swing adsorption unit to adsorb heavy hydrocarbons and water, regenerating the temperature swing adsorbent by heating to form a contaminated gas phase, cooling the contaminated gas phase to separate water and heavy hydrocarbon liquids to form a third gas phase, and directing the third gas phase to a pressure swing adsorption unit to adsorb heavy hydrocarbons from the third gas phase. The product from the pressure swing adsorption unit can be sent to a pipeline or recycled to the temperature swing adsorption unit.

State of the art adsorptive removal of heavy hydrocarbons and water requires considerable amounts of energy during regeneration. In addition, some existing adsorption process schemes cause a highly fluctuating energy demand during regeneration. It is therefore an object of the present invention to increase the efficiency in the removal of heavy hydrocarbons from hydrocarbon-rich gas mixtures using temperature swing adsorption.

DISCLOSURE OF THE INVENTION

Against this background, the present invention proposes a process for removing unwanted components from a gas mixture, particularly for removing heavy hydrocarbons from a hydrocarbon-rich gas mixture, particularly from natural gas, and corresponding apparatus comprising the features of the independent claims. Advantageous embodiments of the present invention are the subject of the dependent claims and of the description that follows.

An essential feature of the present invention is using a peak regeneration, i.e. a regeneration comprising a comparatively short heating pulse, and an advanced process scheme during the regeneration step to reduce the average energy demand as well as the high energy fluctuations in an adsorption-based removal of the unwanted components. According to the present invention, particularly the efficiency of the process is increased and the energy demand is reduced. The present invention is particularly useful to remove heavy hydrocarbons of the type mentioned particularly from natural gas which optionally was treated by suitable treatment steps such as carbon dioxide removal and so-called sweetening. However, such components, particularly water, can also be removed in the process according to the present invention. Components such as carbon dioxide may either simply be passed through the adsorption steps which are proposed according to the present invention and is therefore not necessarily removed before. It can then be removed in a downstream sink for carbon dioxide, such as an absorption unit. Optionally, carbon dioxide may also be removed upstream and therefore is not passed to the steps according to the invention. The specific way of carbon dioxide removal, if necessary, may particularly depend from the gas mixture treated. For example, a gas mixture like air may be treated differently from a gas mixture such as natural gas.

According to the present invention, a process for removal of unwanted components from a feed gas mixture comprising the unwanted components and further components to be transferred into a purified gas mixture is proposed. According to the present invention, particularly a hydrocarbon-rich gas mixture such as natural gas may be used as the feed gas mixture, the hydrocarbon-rich gas mixture comprising heavy hydrocarbons with at least five or six carbon atoms and/or water as the unwanted components and lighter hydrocarbons as the further components. As the hydrocarbon-rich feed gas mixture, as mentioned, particularly natural gas, especially lean natural gas, or a different gas mixture of similar composition can be used. As also mentioned, the present invention can also be used for other feed gas mixtures as already mentioned at the outset.

The gas mixture may particularly contain high amounts of nitrogen. The hydrocarbon-rich feed gas mixture which is used according to a preferred embodiment of the present invention may particularly contain 0.005 to 4 mol.-%, particularly 0.01 to 2 mol.-%, of said heavy hydrocarbons, including hydrocarbons with optionally five and also six, seven, eight and nine carbon atoms. They may particularly include benzene, toluene and/or xylol, particularly in a content from 0.0005 to 0.2 mol.-%. The gas may further particularly contain more than 10 ppm of water and may especially be saturated with water under the conditions used. The feed gas mixture may contain 5 to 99.995 mol.-%, particularly 20 to 95 mol.-% of said lighter hydrocarbons. Particularly, the hydrocarbon-rich feed gas mixture may contain 0.1 to 99.995 mol.-%, particularly 1 to 95 mol.-%, of methane and/or nitrogen. A content of hydrocarbons with two to four or five carbon atoms, i.e. the lighter hydrocarbons, may particularly be in the range from 0.5 to 20 mol.-%, particularly from 1 to 10 mol.-%, these hydrocarbons particularly including 0.1 to 20 mol.-% of hydrocarbons with two, 0.1 to 20 mol.-% of hydrocarbons with three, 0.1 to 5 mol.-% of hydrocarbons with four, and 0.05 to 2 mol.-% of hydrocarbons with five carbon atoms.

In the terminology used herein, liquids and gases may be enriched or depleted in one or more components, these terms referring to a content in a liquid or gas from which the liquid or gas under consideration was obtained. The liquid or gas is enriched if it contains at least 1.1 times, 1.5 times, 2 times, 5 times, 10 times, 100 times or 1000 times the content, and depleted if it contains at most 0.9 times, 0.5 times, 0.1 times, 0.01 times or 0.001 times the content of a corresponding component, relative to the liquid or gas it was derived from.

The present application uses the terms pressure level and temperature level to characterise pressures and temperatures, the purpose of which is to express that pressures and temperatures need not be used in the form of exact pressure or temperature values in order to realise the inventive concept. However, such pressures and temperatures are typically within certain ranges around an average or set value. Corresponding pressure levels and temperature levels may be in disjoint ranges or in ranges that overlap. In particular, pressure levels include unavoidable pressure losses. The same applies to temperature levels. The pressure levels indicated here in bar are absolute pressures. For example, the feed gas mixture treated according to the present invention may be provided at a pressure level in a range of e.g. 20 to 100 bar (abs.), with a fluctuation margin of e.g. up to 5 bar.

In the process according to the present invention, a temperature swing adsorption unit comprising at least two adsorption vessels is used. In one embodiment of the present invention, a minimum of three adsorption vessels is used as explained hereinbelow, but the present invention is not limited to using exactly three adsorption vessels in this connection. In a further embodiment, a minimum of only two adsorption vessels is used, but the present invention is likewise not limited to this number. At any time, if specific reference is made to "a" or "one" adsorption vessel is used in a certain way, this is not intended to be limiting but may also include more than one adsorption vessel, particularly operated in parallel in each case, unless specifically indicated.

Temperature swing adsorption (TSA) is, as generally known, an adsorptive process for the separation of gas mixtures in which the adsorbent used is regenerated using thermal energy. Temperature swing adsorption is used, for example, for waste gas purification or for processing gas mixtures such as, like in the present invention, natural or synthesis gas. Other gas mixtures can also be separated in a corresponding manner by means of thermal swing adsorption, for example gas mixtures such as biogas or waste gases from chemical or physical gas scrubbing processes such as rectisol or amine scrubbing, provided that their composition is suitable for the separation. The present invention is not limited to the use of certain adsorbents or gas mixtures, provided that they fall under the scope of the independent claims. Examples of gas mixtures treatable accordingly were already given above.

Temperature swing adsorption makes use of the temperature dependence of adsorption processes. For adsorbing certain components of a gas mixture, a stream formed from the gas mixture, which hereinafter is referred to as an "adsorption gas stream", is passed through an adsorbent accommodated in a container which hereinafter is referred to as an "adsorption vessel". This is done at a lower temperature level in an operating mode also referred to as an "adsorption cycle" with respect to the specific adsorption vessel. As a consequence, the adsorbent is loaded with the adsorbing components to be separated from adsorption gas stream. In a subsequent operating cycle, the adsorbent is regenerated by desorbing these components by heating, i.e. by introducing thermal energy. This operating cycle is also referred to as the "regeneration cycle". After the heating phase, the adsorption vessel needs to be cooled, in order to be prepared for being operated in a subsequent adsorption phase. In the context of the description herein, this cooling phase is referred to as being part of the regeneration phase. The cooling phase could, in the alternative, also be described as a phase separate to the actual regeneration phase and the present invention is not limited by these interchangeable definition alternatives.

For the continuous operation of a temperature swing adsorption apparatus, at least two adsorption vessels are required, such that the gas mixture to be treated may always be passed through at least one of the adsorption vessels. This does not necessarily mean that there are only phases in which exactly one adsorption vessel is used for adsorption. Rather, phases may be present in which two or more adsorption vessels, particularly in larger arrangements, can be operated in an adsorption mode.

Temperature swing adsorption can be used in particular in systems with components that have high affinities. The cycle times of the explained operating cycles are usually several hours. Temperature swing adsorption is generally used to remove low concentrated components in gas mixtures and is typically less suitable for removing higher concentrated components.

In temperature swing adsorption, in other words, a suitable gas stream which is hereinafter referred to as a "regeneration gas stream" is passed in the regeneration cycle in heated form directly over the adsorbent. The regeneration gas stream desorbs and absorbs the components previously adsorbed to the adsorbent. The regeneration gas can classically be a purified process product, for example steam or nitrogen. The use of other regeneration gases is also possible. Subsequent to such a regeneration phase, a cooling phase is present, in order to prepare the adsorbent for use in subsequent adsorption cycle. As mentioned, hereinafter the heating and cooling phases are considered to form part of the regeneration cycle.

The method according to the present invention, in yet other words, like regular temperature swing adsorption methods just described, comprises cyclically operating the temperature swing adsorption unit in successive operation modes in each of which a different one of the at least two adsorption vessels is operated in an adsorption mode or cycle while a further one of the at least two adsorption vessels previously operated in the adsorption mode is operated in a regeneration mode or cycle. As mentioned, also more than one adsorption vessel can be operated in this manner, particularly if a larger number of adsorption vessels is present, and adsorption vessels may be operated in parallel. The adsorption mode comprises forming an adsorption gas stream using a part of the feed gas mixture and passing the adsorption gas stream through the adsorption vessel operated in the adsorption mode. The adsorption gas stream leaving the adsorption vessel operated in the adsorption mode, which is depleted in the unwanted components like the heavy hydrocarbons in an embodiment of the invention, may then be used in forming the purified gas mixture, which may then be used a product stream and/or may be withdrawn for other uses or treatments such as liquefaction. The regeneration mode comprises passing a regeneration gas stream through the adsorption vessel operated in the regeneration mode.

According to the present invention, the regeneration gas stream is formed using a further part of the feed gas mixture and/or a part of the purified gas mixture, which is in embodiments of the present invention either passed through a further adsorption vessel or not. The regeneration mode comprises, according to the present invention, a comparatively short heating or phase of 5 to 90 minutes, particularly 8 to 45 minutes, during which the regeneration gas stream is heated to a desorption temperature level of 80 to 350° C., particularly 120 to 250° C., and is thereafter passed through the adsorption vessel operated in the regeneration mode.

According to the present invention, the regeneration mode further comprises a cooling phase subsequent to the heating phase in which the regeneration gas stream is passed through the adsorption vessel operated in the regeneration mode without being heated to the desorption temperature level. It particularly may not receive any temperature-influencing treatment, but e.g. may also be cooled before being used accordingly. According to the present invention, the heating phase and the cooling phase are timed such that a temperature peak, i.e. a maximum temperature, of the regeneration gas withdrawn from the adsorption vessel operated in the regeneration mode, which is the result of said heating the regeneration gas stream in the heating phase, occurs in the subsequent cooling phase, but preferentially not in the heating phase. In other words, a time which is required for heating peak to pass the adsorption vessel operated in the regeneration mode is preferably longer than the heating phase and the heating peak exits the adsorption vessel operated in the regeneration mode in the subsequent cooling phase.

At least a part of the regeneration gas stream is recycled and is used in forming the adsorption gas stream. Herein, the terms "heating phase" and "heating step" are used interchangeably and are intended to have the same meaning. The same is the case for the terms "cooling phase" and "cooling step".

According to the present invention, the energy demand as compared to presently existing process can be reduced significantly, due to the short heating pulse being used. It was surprisingly found that also a short heating pulse, as used according to the present invention, suffices to provide a satisfactory regeneration. In addition, fluctuations in the energy demand can be minimized, as further explained below. Heavy hydrocarbons or other unwanted components can therefore, according to the present invention, be removed more efficiently, since less energy is required. Additionally, the present invention particularly results in a reduction of complexity of the regeneration gas system used, as described below.

The present invention, as mentioned, includes two embodiments which are referred to as "first" and "second" embodiment hereinbelow. These particularly differ, as mentioned, in the treatment of the regeneration gas formed from the feed gas mixture, i.e. in whether this is passed through a further adsorption vessel or not.

In the first embodiment the inventive process consists of a minimum of three adsorption vessels. While one adsorption vessel is in adsorption mode, a second vessel is providing a clean regeneration gas to a third vessel which is in the regeneration mode. Contrary to the prior art, the heating and cooling phases during one period are not conducted in parallel in different adsorption vessels. That is, in an adsorption period of one adsorption vessel, a parallel adsorption vessel to be regenerated is first in a heating phase and subsequent thereto in a cooling phase during the adsorption phase of the former, i.e. it is in regeneration, while a yet further adsorption vessel is providing clean regeneration gas for the cooling or heating phase of the regeneration.

According to the general concept of the present invention, which is applicable to both the first and the second embodiment of the present invention, the heating phase consists of, or comprises, a comparatively short heat pulse, as mentioned. During the subsequent cooling phase the heat is then "pushed" through the adsorption vessel, forming a "heat plug" passing through the adsorption vessel and the residual heat leaves the adsorption vessel during the cooling step. The direction of the regeneration gas in the heating and cooling phase is preferably counter-current to the flow during adsorption. The direction of the flow during the provision of the regeneration gas is preferably co-current to the direction of the flow during adsorption.

In the first embodiment, the energy demand during the heating step is close to constant since the adsorption vessel that is providing the regeneration gas is already cooled down and therefore no fluctuations in the inlet temperature to the regeneration gas heater are present which would require a largely fluctuating heating power.

In other words, in the first embodiment, the temperature swing adsorption unit comprising at least three adsorption vessels, wherein in each of the successive operation modes one of the adsorption vessels, which is not operated in the adsorption mode and not operated in the regeneration mode, is operated in a regeneration gas provision mode which includes passing the further part of the feed gas mixture used in forming the regeneration gas stream through the adsorption vessel operated in the regeneration gas provision mode first.

In the second embodiment, the novel process consists of at least two adsorption vessels. While one adsorption vessel is in adsorption the other vessel is undergoing regeneration. Contrary to the state of the art, and according to the basic principle of the present invention, during regeneration a short heat pulse is used in the heating phase. During the cooling phase, the heat is, like before, "pushed" through the adsorber and the residual heat leaves the vessel during the cooling phase.

The direction of the regeneration gas flow can, in an adsorption arrangement, generally be counter-current or co-current to the direction of the flow during adsorption. In the context of the present invention, however, whether a counter-current or co-current regeneration gas stream is used, depends on whether a further part of the feed gas or a part of the product gas is used. In the former case, the direction of the flow during adsorption and regeneration is preferably co-current, as in this way the feed gas which is used for regeneration and which first contacts the "impure" end of the adsorption bed does not contaminate the "pure" end. In contrast, in the latter case, i.e. if a part of the product stream is used for regeneration, this is already purified and is therefore used counter-current to adsorption as it then first contacts the "pure" end, takes up the unwanted components in the course of flowing through the adsorption vessel and can be withdrawn there. In case of a co-current flow, the energy demand during the heating step is constant since the regeneration gas is taken from the feed gas and routed directly to the regeneration gas heater.

In other words, in the second embodiment forming the regeneration gas stream using a further part of the feed gas mixture includes passing the further part of the feed gas mixture through the adsorption vessel operated in the regeneration mode without previously passing the further part of the feed gas mixture through one of the adsorption vessels. If a part of the product stream is used, this can likewise be used without passing it through an adsorption vessel.

In the first and in the second embodiment, the further part of the feed gas mixture is, to avoid misunderstandings, except being passed through the corresponding adsorption vessel in the first embodiment and the heating step, not further treated to change its composition. That is, it is particularly not being formed from gas having passed the adsorption vessel in the adsorbing mode before, i.e. from a product stream. It is formed from either cold feed gas, or feed gas at a constant temperature level, whether or not this is passed through the corresponding adsorption vessel.

In the present invention, just to avoid misunderstandings, the adsorption gas stream is depleted in the unwanted compounds such as heavy hydrocarbons while being passed through the adsorption vessel operated in the adsorption mode and the regeneration gas stream is enriched in the unwanted compounds such as heavy hydrocarbons while being passed through the adsorption vessel operated in the regeneration mode. The adsorption gas stream depleted in the unwanted compounds such as heavy hydrocarbons after having been passed through the adsorption vessel operated in the adsorption mode is later used e.g. in a liquefaction step or pipeline conditioning step which may form part of the present invention, which thus effectively relates to a method of liquefaction of the feed gas mixture. The regeneration gas stream which is enriched in the unwanted compounds such as heavy hydrocarbons and is treated as mentioned before and as further described hereinafter.

As mentioned, the adsorption gas stream and the regeneration gas stream are preferably passed through the adsorption vessel operated in the adsorption mode and the adsorption vessel operated in the regeneration mode in the same or in opposite directions, depending on the specific mode of operation.

As also mentioned, the regeneration gas stream is enriched in the unwanted compounds such as heavy hydrocarbons while being passed through the adsorption vessel operated in the regeneration mode. The regeneration gas stream or the part thereof being recycled and being used in forming the adsorption gas stream is preferably depleted in the unwanted compounds such as heavy hydrocarbons before being used in forming the adsorption gas stream and after having been passed through the adsorption vessel operated in the regeneration mode, i.e. in the recycle. Depleting the regeneration gas stream or the part thereof being recycled and being used in forming the adsorption gas stream particularly may include at least one of a flashing, a cooling and an absorption step such as an oil wash or scrubbing to at least partially knock out the heavy hydrocarbons. Also other methods as generally known in the art may be used according to the present invention. A flashing step may particularly include a pressure reduction from a pressure level of 20 to 150 bar to a pressure level of 5 to 50 bar. A cooling step may particularly include a temperature reduction from a temperature level of 350° C. or less to 0° C. or more.

In the process according to any of the preceding claims, heating the regeneration gas stream in the heating phase particularly includes passing the regeneration gas stream through a heater and passing the regeneration gas stream through the adsorption vessel operated in the regeneration mode without being heated thereafter, i.e. after the heating pulse, includes bypassing the heater. In the process according to the present invention, at least one of a silica gel, an alumina gel, an activated coal, a zeolithe, i.e. a molecular sieve, or a combination thereof may be used as an adsorbent in the adsorption vessels. In the context of the present invention, internally insulated vessels may particularly be used as the adsorption vessels.

The apparatus for removal of unwanted components such as heavy hydrocarbons with at least five or six carbon atoms from a feed gas mixture such as a hydrocarbon-rich feed gas mixture comprising the unwanted components and further components to be transferred into a purified gas mixture, such as the heavy hydrocarbons and lighter hydrocarbons, which is provided according to the present invention, includes a temperature swing adsorption unit comprising at least two adsorption vessels, the apparatus being adapted to cyclically operate the temperature swing adsorption unit in successive operation modes in each of which a different one of the at least two adsorption vessels is operated in an adsorption mode while a further one of the at least two adsorption vessels previously operated in the adsorption mode is operated in a regeneration mode. The apparatus is further adapted to form, in the adsorption mode, an adsorption gas stream using a part of the feed gas mixture and to pass the adsorption gas stream through the adsorption vessel operated in the adsorption mode, thereby forming the purified gas mixture and the apparatus is further adapted to pass, in the regeneration mode, a regeneration gas stream through the adsorption vessel operated in the regeneration mode.

According to the present invention, means adapted to form the regeneration gas stream using a further part of the feed gas mixture and/or a part of the purified gas mixture are provided, as well as means adapted to perform the regeneration mode comprising a heating phase of 5 to 90 minutes in which the regeneration gas stream is heated to a desorption temperature level of 80 to 350° C. and is thereafter passed through the adsorption vessel operated in the regeneration mode. The means adapted to perform the regeneration mode are further adapted to perform a cooling phase subsequent to the heating phase in which the regeneration gas stream is passed through the adsorption vessel operated in the regeneration mode without being heated to the desorption temperature level, and means adapted to recycle at least a part of the regeneration gas stream and to use said stream in forming the adsorption gas stream are provided.

As to further features and specific advantages of the present invention, reference is made to the explanations of the inventive method and its embodiments above. This also applies to an apparatus according to a particularly preferred embodiment which comprises means adapted to perform a corresponding method.

The present invention is further described with reference to the appended drawings illustrating embodiments of the present invention.

SHORT DESCRIPTION OF THE FIGURES

Figure 1:
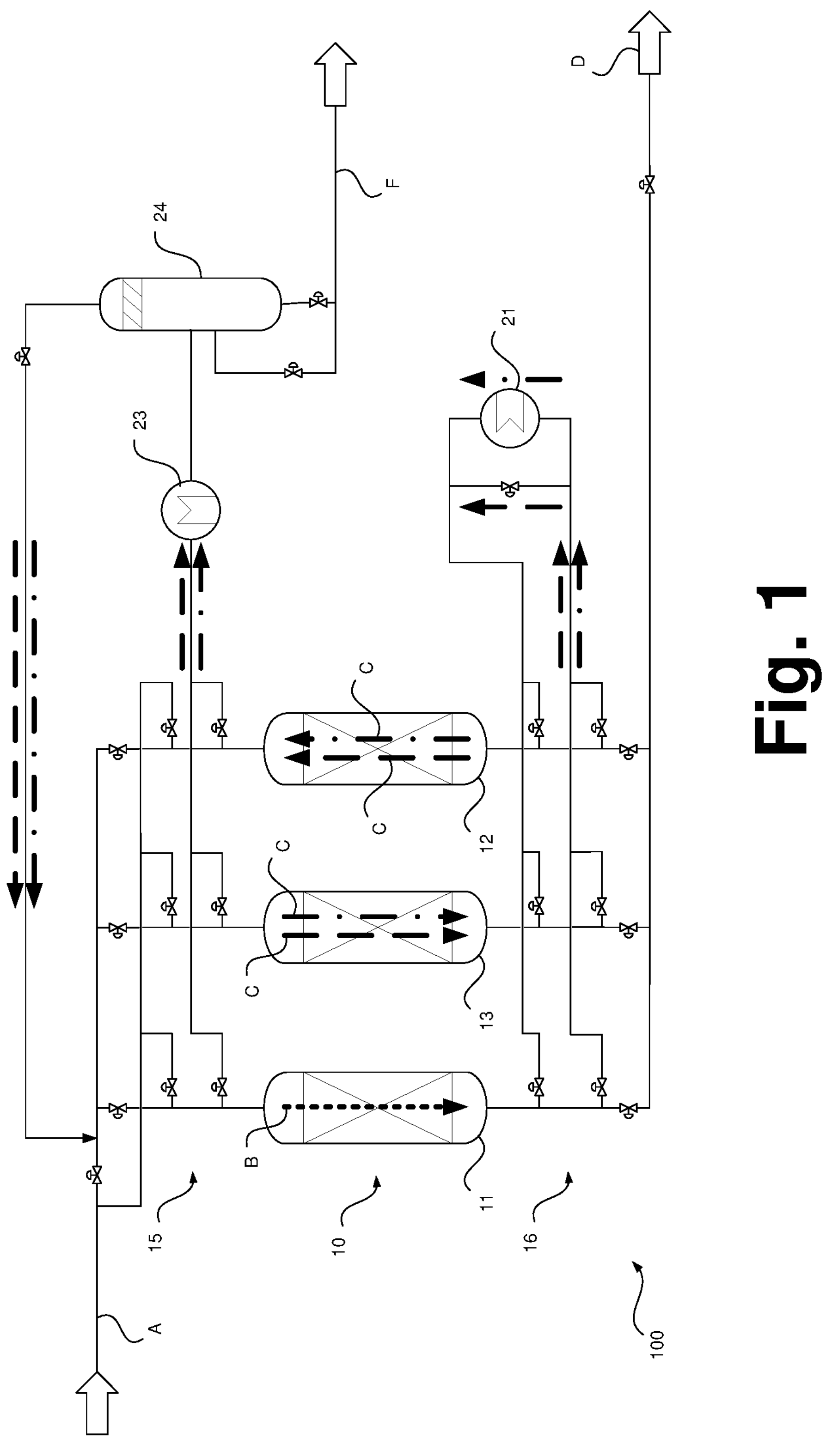
FIG. 1 illustrates a method according to a particularly preferred embodiment of the present invention in the form of a simplified process flow diagram.

In the Figures, elements of identical or comparable construction and/or function are indicated with identical reference numerals and are not repeatedly explained for reasons of conciseness. Explanations relating to methods and steps thereof shall equally apply to apparatus adapted to carry out such method.

EMBODIMENTS OF THE INVENTION

The embodiments of the present invention illustrated hereinbelow are described with reference to a hydrocarbon-rich gas mixture being used as the feed gas mixture, the hydrocarbon-rich gas mixture comprising heavy hydrocarbons with at least five carbon atoms and/or water as the unwanted components. The explanations, however, also apply to other unwanted components and gas mixtures, as mentioned.

FIG. 1 illustrates a method 100 according to a particularly preferred embodiment of the present invention, the “first” embodiment referred to hereinabove, in the form of a simplified process flow diagram.

In the process 100 for removal of heavy hydrocarbons with at least five or six carbon atoms from a hydrocarbon-rich feed gas mixture A, e.g. pretreated natural gas, comprising the heavy hydrocarbons and lighter hydrocarbons, a temperature swing adsorption unit 10 comprising at least three adsorption vessels 11, 12 and 13 is used. The temperature swing adsorption unit 10 is cyclically operated in successive operation modes in each of which a different one of the at least three adsorption vessels 11, 12, 13 is operated in an adsorption mode while a further one of the at least three adsorption vessels 11, 12, 13 previously operated in the adsorption mode is operated in a regeneration mode. A yet further one of the at least three adsorption vessels 11, 12, 13 is used in a regeneration gas provision mode.

In FIG. 1, a snapshot is illustrated wherein the adsorption vessel 11 is operated in the adsorption mode and the vessel 12 is operated in a regeneration mode by switching armatures 15 and 16 accordingly (not illustrated in detail). An adsorption gas stream B formed using a part of the feed gas mixture A (illustrated as dotted line) is passed through the adsorption vessel 11 which is operated in an adsorption mode. A regeneration gas stream C (illustrated as dashed and dash-dotted lines which are partially shown parallel to each other for reasons of illustration only, see below) is passed through the adsorption vessel 12 which is operated in a regeneration mode in a direction opposite to that in which the adsorption gas stream B is passed through the adsorption vessel 11. Before, the regeneration gas stream C is passed through the adsorption vessel 13 and is cleaned therein.

The regeneration gas stream C is formed using a further part of the feed gas mixture A. The regeneration mode comprises a heating phase as mentioned, in which the regeneration gas stream C is heated to a desorption temperature level. This is illustrated with the dashed-dotted arrows, corresponding to fluid being passed through a heat exchanger 21. It is thereafter passed through the adsorption vessel 12 operated in the regeneration mode. The regeneration mode further comprises a cooling phase subsequent to the heating phase in which the regeneration gas stream C is passed, as illustrated with the dashed arrows, through the adsorption vessel 12 operated in the regeneration mode without being heated in the heater 21 to the desorption temperature level. The regeneration gas stream C is then, as illustrated in FIG. 1, recycled and used in forming the adsorption gas stream B.

Before being recycled and used in forming the adsorption gas stream B, the regeneration gas stream C is cooled using a heat exchanger 23 to knock out heavy hydrocarbons. Additionally, but not shown here, the regeneration gas stream C may also be flashed using an expansion valve not shown here. It is then passed through a vessel 24 in which the heavy hydrocarbons collect and may be withdrawn as a stream F. The remainder, still indicated with C, is recycled as shown. Further valves are used for switching between the adsorbing vessels 11, 12 and 13 but are not further explained for reasons of conciseness. The adsorption gas stream B is, after having been passed through the adsorption vessel 11 which is operated in an adsorption mode, used in forming a product stream D which can passed to further steps such as liquefaction or in a pipeline conditioning step or other downstream processes.

Figure 2:
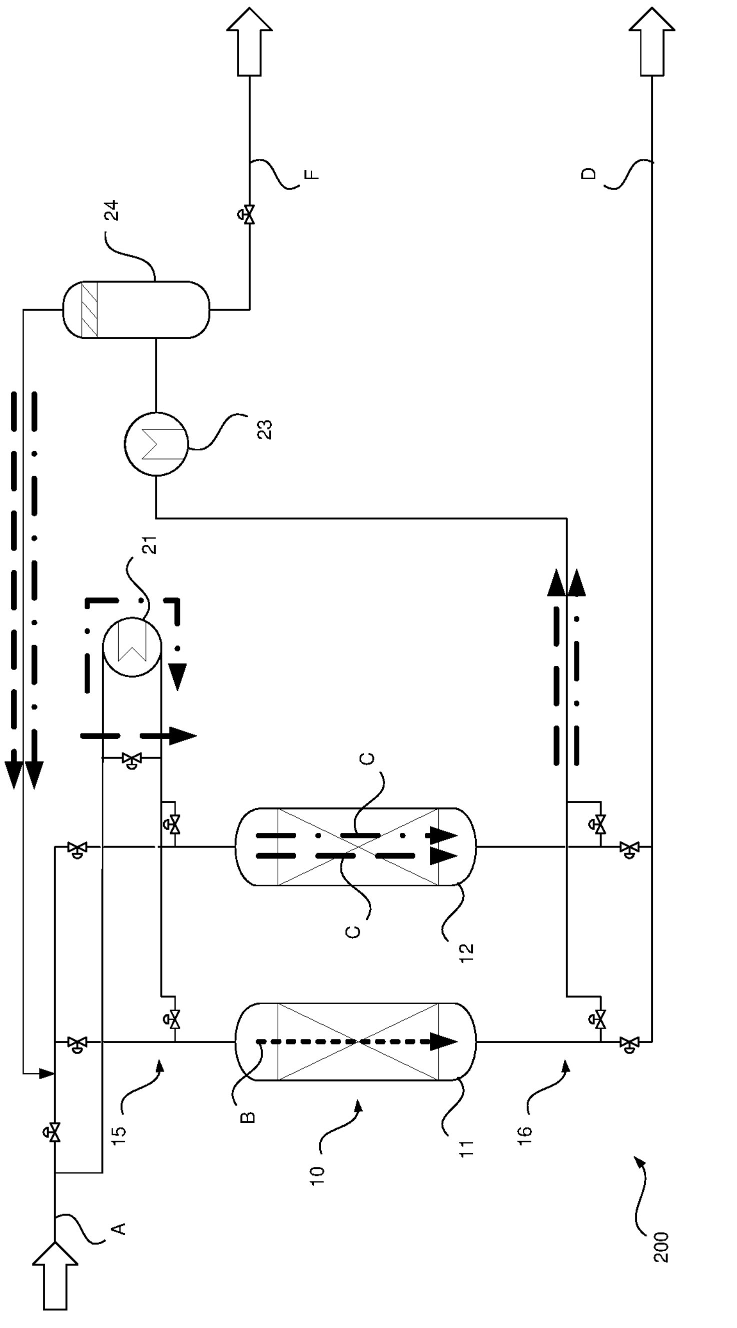
FIG. 2 illustrates a method according to a particularly preferred embodiment of the present invention in the form of a simplified process flow diagram.

FIG. 2 illustrates a method 200 according to a particularly preferred embodiment of the present invention, the "second" embodiment referred to hereinabove, in the form of a simplified process flow diagram.

Here, no adsorption vessel is operated as described for the adsorption vessel 13 according to FIG. 1. Rather, forming the regeneration gas stream C using a further part of the feed gas mixture A for use in the regeneration mode in vessel 12 here includes passing the further part of the feed gas mixture A through the adsorption vessel 12 operated in the regeneration mode without passing the further part of the feed gas mixture A through one of the adsorption vessels 11, 12 or an adsorption vessel 13 shown before in connection with method 100. The regeneration gas stream C is passed through the adsorption vessel 12 in the same direction as the adsorption gas stream B is passed through the adsorption vessel 11. As to the functionality, which may except for these differences essentially be the same as before, reference is made to the explanations of FIG. 1 and the explanations further above. As only partially shown here, the regeneration gas stream C bypasses the heater 21 after the initial heating pulse. After having been passed through the adsorption vessel 12, the regeneration gas stream C is treated in the heat exchanger 23 and the vessel 24 as before described for method 100.

Figure 3:
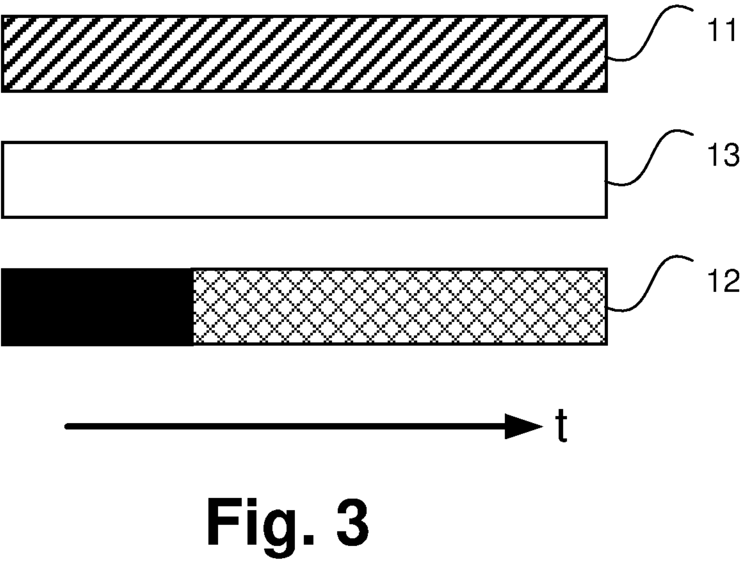
FIG. 3 illustrates operation phases of adsorbing vessels used in the method according to FIG. 1 in the form of a diagram.

FIG. 3 illustrates operation phases of adsorbing vessels 11, 12, 13 used in the method according to FIG. 1 in the form of a diagram, where the same reference numerals for the adsorption vessels 11, 12 and 13 are used and the operating conditions or states are depicted in the form of bar diagrams over a horizontal time axis t. As can be seen, the adsorption vessel 11 is in adsorption mode (illustrated as hatched region) while the adsorption vessel 12 is in regeneration mode including a heating phase (solid black region) and a cooling phase (cross-hatched region). Adsorption vessel 13 is used in providing the regeneration gas stream (solid white region). Be it known that the method according to an embodiment of the invention includes cyclically switching the operation conditions or states for the adsorption vessels 11, 12 and 13.

Figure 4:
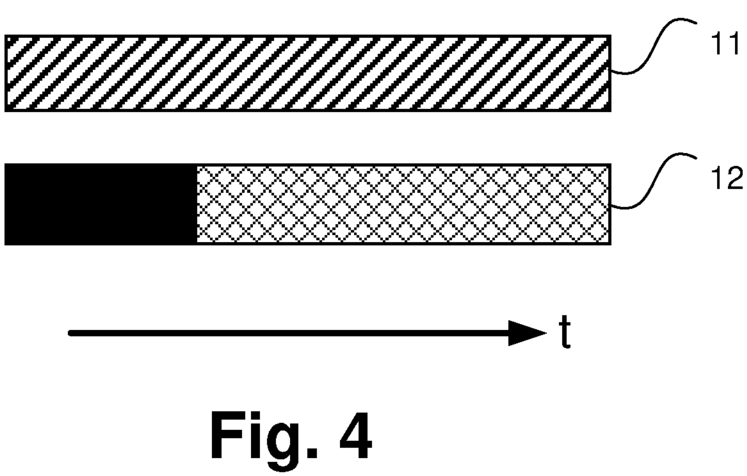
FIG. 4 illustrates operation phases of adsorbing vessels used in the method according to FIG. 2 in the form of a diagram.

FIG. 4 illustrates operation phases of an adsorbing vessel used in the method according to FIG. 2 in the form of a diagram essentially corresponding to that of FIG. 3. As the adsorption vessel 13 is missing, a corresponding regeneration gas provision step is also not present.

Figure 5:
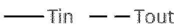
FIG. 5 illustrates operation phases of an adsorbing vessel used in the method according to FIG. 1 in the form of a further diagram.
Figure 5:
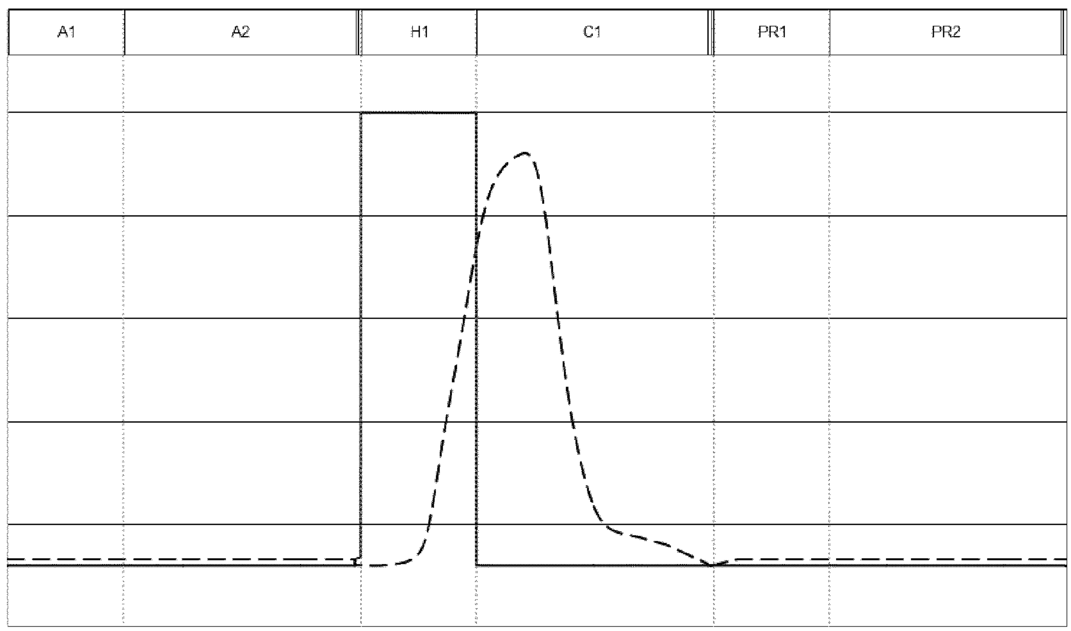

FIG. 5 illustrates operation phases of an adsorbing vessel 11, 12, 13 used in the method according to FIG. 1 in the form of a further diagram. In the diagram of FIG. 5, which illustrates temperatures on the ordinate over time on the abscissa for an arbitrary one adsorption vessel 11, 12, 13, adsorption phases forming a single adsorption step are indicated with A1 and A2 just for illustration purposes while the heating phase during regeneration is indicated with H1 and the cooling phase is indicated with C1. A single regeneration gas provision step is provided of which phases are indicated with PR1 and PR2 just for illustration purposes. Graph Tin indicates an inlet temperature to the adsorbing vessel 11, 12 or 13, and Graph Tout indicates an outlet temperature.

Figure 6:
FIG. 6 illustrates operation phases of an adsorbing vessel used in the method according to FIG. 2 in the form of a further diagram.
Figure 6:
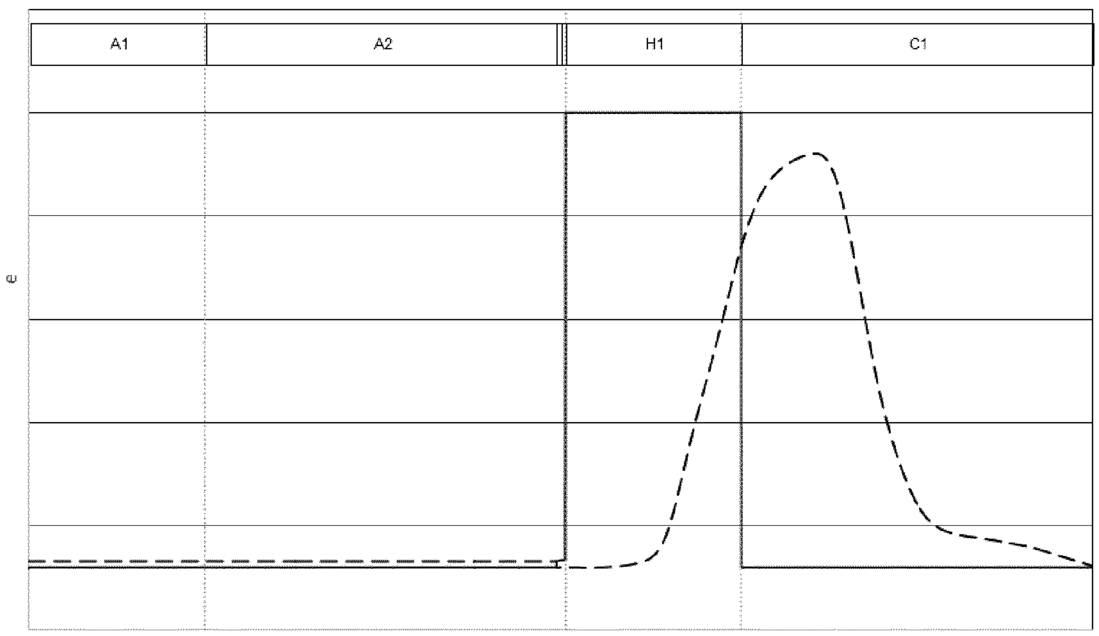

FIG. 6 illustrates operation phases of an adsorbing vessel 11, 12 used in the method according to FIG. 2 in the form of a further diagram, where diagram features, insofar present, correspond to those of FIG. 5. Reference is made to the explanations there. As no adsorption vessel 13 is present, the phases PR1, PR2 are missing. It is to be noted that in all cases shown here, the temperature profiles are representative examples only. The temperature profile at the outlet of the respective adsorption vessels can be—e.g. with regard to peak widths and heights—be different and/or shifted on the time axis.

As mentioned, the heating phase and the cooling phase may be timed such that a temperature peak, i.e. a maximum temperature, of the regeneration gas withdrawn from the adsorption vessel operated in the regeneration mode, which is the result of said heating the regeneration gas stream in the heating phase, occurs in the subsequent cooling phase, but preferentially not in the heating phase.

Figure 7:
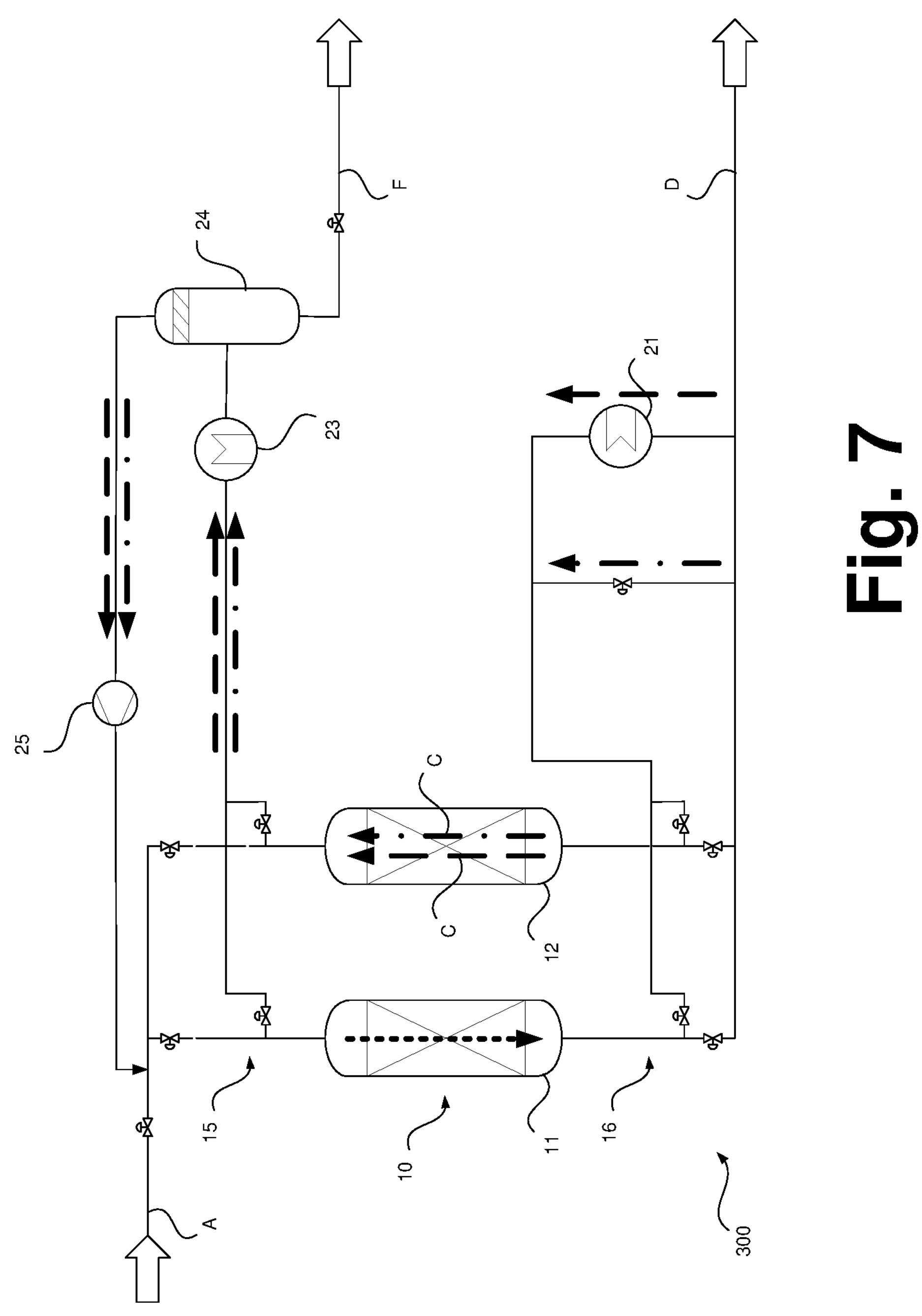
FIG. 7 illustrates a method according to a particularly preferred embodiment of the present invention in the form of a simplified process flow diagram.

FIG. 7 illustrates a method 300 according to a further embodiment of the present invention, in the form of a simplified process flow diagram.

In contrast to method 200 according to FIG. 2, forming the regeneration gas stream C is performed using a part of the purified gas mixture of stream D which is used in a manner similar to the part of the feed gas mixture A. As to the functionality, which may except for these differences essentially be the same as before, reference is made to the explanations of FIG. 2 and the explanations further above. A blower 25 may be used in this connection.

The invention claimed is:

1. A process for removal of unwanted components from a feed gas mixture comprising the unwanted components and further components to be transferred into a purified gas mixture, the method comprising:

cyclically operating a temperature swing adsorption unit, comprising at least two adsorption vessels, in successive operation modes in each of which a different one of the at least two adsorption vessels is operated in an adsorption mode while a further one of the at least two adsorption vessels previously operated in the adsorption mode is operated in a regeneration mode, the adsorption mode comprises forming an adsorption gas stream using a part of the feed gas mixture and passing the adsorption gas stream through the adsorption vessel operated in the adsorption mode, thereby forming the purified gas mixture, the regeneration mode comprises passing a regeneration gas stream through the adsorption vessel operated in the regeneration mode, wherein the regeneration gas stream is formed using a further part of the feed gas mixture and/or a part of the purified gas mixture, wherein the regeneration mode comprises a heating phase of 5 to 90 minutes in which the regeneration gas stream is heated to a desorption temperature level of 80 to 350° C. and is thereafter passed through the adsorption vessel operated in the regeneration mode, wherein the regeneration mode further comprises a cooling phase subsequent to the heating phase in which the regeneration gas stream is passed through the adsorption vessel operated in the regeneration mode without being heated to the desorption temperature level, and wherein at least a part of the regeneration gas stream is recycled and is used in forming the adsorption gas stream, wherein, during the regeneration mode, the heating and the cooling phase are not conducted in parallel in different adsorption vessels, and wherein the heating phase and the cooling phase are timed such that a maximum temperature of the regeneration gas withdrawn from the adsorption vessel operated in the regeneration mode resulting from said heating of the regeneration gas stream in the heating phase occurs in the subsequent cooling phase, and not in the heating phase.

2. The process according to claim 1, wherein a hydrocarbon-rich gas mixture is used as the feed gas mixture, the hydrocarbon-rich gas mixture comprising heavy hydrocarbons with at least five carbon atoms and/or water as the unwanted components and lighter hydrocarbons as the further components to be transferred into the purified gas mixture.

3. The process according to claim 1, wherein the temperature swing adsorption unit comprises at least three adsorption vessels, wherein in each of the successive operation modes one of the adsorption vessels which is not operated in the adsorption mode and not operated in the regeneration mode is operated in a regeneration gas provision mode including passing the further part of the feed gas mixture used in forming the regeneration gas stream through the adsorption vessel operated in the regeneration gas provision mode.

4. The process according to claim 1, wherein forming the regeneration gas stream using a further part of the feed gas mixture includes passing the further part of the feed gas mixture through the adsorption vessel operated in the regeneration mode without passing the further part of the feed gas mixture through one of the adsorption vessels before.

5. The process according to claim 1, wherein the adsorption gas stream is depleted in the unwanted components while being passed through the adsorption vessel operated in the adsorption mode and wherein the regeneration gas stream is enriched in the unwanted components while being passed through the adsorption vessel operated in the regeneration mode.

6. The process according to claim 1, wherein the adsorption gas stream and the regeneration gas stream are passed through the adsorption vessel operated in the adsorption mode and the adsorption vessel operated in the regeneration mode, respectively, in the same direction.

7. The process according to claim 6, wherein the regeneration gas stream or the part thereof being recycled and being used in forming the adsorption gas stream is depleted in the unwanted components before being used in forming the adsorption gas stream and after having been passed through the adsorption vessel operated in the regeneration mode.

8. The process according to claim 7, wherein depleting the regeneration gas stream or the part thereof being recycled and being used in forming the adsorption gas stream includes at least one of a flashing, a cooling, an expansion cooling, and an absorption step to at least partially remove the unwanted components.

9. The process according to claim 1, wherein heating the regeneration gas stream in the heating phase includes passing the regeneration gas stream through a heater, and passing the regeneration gas stream through the adsorption vessel operated in the regeneration mode without being heated includes bypassing the heater.

10. The process according to claim 1, wherein at least one of a silica gel, an alumina gel, an activated coal, a zeolite, or a combination thereof is used as an adsorbent in the adsorption vessels.

11. The process according to claim 1, wherein internally insulated vessels are used as the adsorption vessels.

12. The process according to claim 1, wherein the adsorption gas stream and the regeneration gas stream are passed through the adsorption vessel operated in the adsorption mode and the adsorption vessel operated in the regeneration mode, respectively, in opposite directions.

13. The process according to claim 1, wherein the heating phase is 8 to 45 minutes during which the regeneration gas stream is heated to a desorption temperature level of 120 to 250° C. and is thereafter passed through the adsorption vessel operated in the regeneration mode.

14. The process according to claim 7, wherein depleting the regeneration gas stream or the part thereof being recycled and being used in forming the adsorption gas stream comprises flashing wherein the pressure is reduced from a pressure level of 20 to 150 bar to a pressure level of 5 to 50 bar.

15. The process according to claim 7, wherein depleting the regeneration gas stream or the part thereof being recycled and being used in forming the adsorption gas stream comprises cooling.

16. The process according to claim 1, wherein, during the heating phase of the regeneration mode, the regeneration gas stream is passed through a heat exchanger before the regeneration gas stream is passed through the adsorption vessel, and wherein, during the cooling phase of the regeneration mode, the regeneration gas stream bypasses the heat exchanger before the regeneration gas stream is passed through the adsorption vessel.

17. The process according to claim 1, wherein the temperature swing adsorption unit comprises at least three adsorption vessels, wherein in each of the successive operation modes one of the adsorption vessels, which is not operated in the adsorption mode and not operated in the regeneration mode, is operated in a regeneration gas provision mode, wherein, in the regeneration gas provision mode, part of the feed gas mixture used in forming the regeneration gas stream is passed through the adsorption vessel operated in the regeneration gas provision mode, and then:

(a) is heated by passage through a heat exchanger and used as the regeneration gas in the adsorption vessel that is operated in the heating phase of the regeneration mode, or (b) bypasses the heat exchanger and is used as the regeneration gas in the adsorption vessel that is operated in the cooling phase of the regeneration mode.

18. An apparatus for removal of unwanted components from a feed gas mixture comprising the unwanted component and further components to be transferred into a purified gas mixture, the apparatus comprising:

a temperature swing adsorption unit comprising at least two adsorption vessels, the apparatus being adapted to cyclically operate the temperature swing adsorption unit in successive operation modes in each of which a different one of the at least two adsorption vessels is operated in an adsorption mode while a further one of the at least two adsorption vessels previously operated in the adsorption mode is operated in a regeneration mode, the apparatus further being adapted to form, in the adsorption mode, an adsorption gas stream using a part of the feed gas mixture and to pass the adsorption gas stream through the adsorption vessel operated in the adsorption mode, thereby forming the purified gas mixture, and the apparatus further comprising means adapted to form a regeneration gas stream using a further part of the feed gas mixture and/or a part of the purified gas mixture, means adapted to pass, in the regeneration mode, the regeneration gas stream through the adsorption vessel operated in the regeneration mode, means adapted to perform the regeneration mode comprising a heating phase of 5 to 90 minutes in which the regeneration gas stream is heated to a desorption temperature level of 80 to 350° C. and is thereafter passed through the adsorption vessel operated in the regeneration mode, means adapted to perform the regeneration mode further comprising a cooling phase subsequent to the heating phase in which the regeneration gas stream is passed through the adsorption vessel operated in the regeneration mode without being heated to the desorption temperature level and wherein, during the regeneration mode, the heating and the cooling phase are not conducted in parallel in different adsorption vessels, and means adapted to recycle at least a part of the regeneration gas stream and use the at least a part of the regeneration gas stream in forming the adsorption gas stream, and means for timing the heating phase and the cooling phase such that a maximum temperature of the regeneration gas withdrawn from the adsorption vessel operated in the regeneration mode resulting from said heating of the regeneration gas stream in the heating phase occurs in the subsequent cooling phase, and not in the heating phase.

19. The apparatus according to claim 18, further comprising means to provide the feed gas mixture in the form of a hydrocarbon-rich gas mixture, the hydrocarbon-rich gas mixture comprising heavy hydrocarbons with at least five carbon atoms and/or water as the unwanted components and lighter hydrocarbons as the further components to be transferred into the purified gas mixture.

* * * * *